Figure 1:
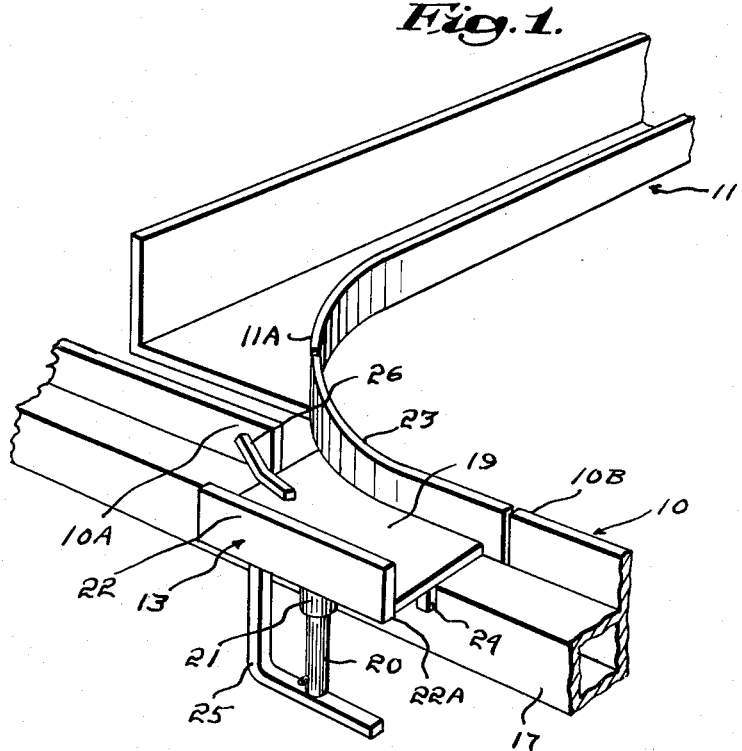

Sept. 7, 1965     J. W. O'DONNELL     3,204,575
OVERHEAD RAIL SYSTEMS
Filed May 3, 1963     2 Sheets-Sheet 1

Inventor:
James W. O'Donnell,
by [signature]
Attorney

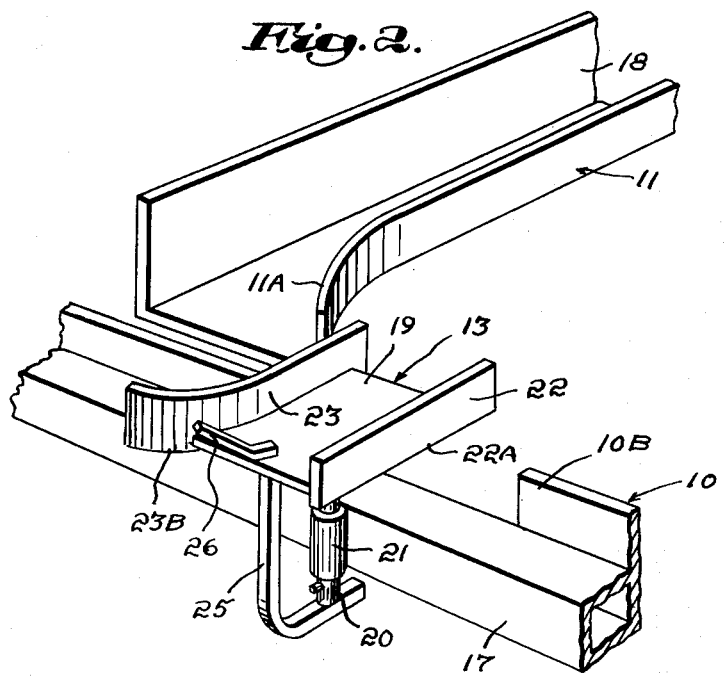
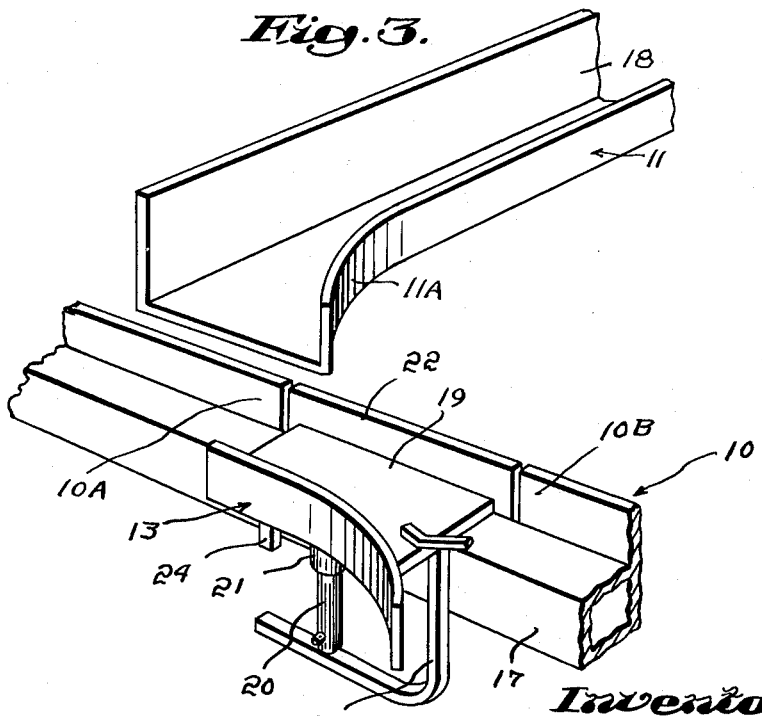

United States Patent Office 3,204,575
Patented Sept. 7, 1965

3,204,575
OVERHEAD RAIL SYSTEMS
James W. O'Donnell, Main St., Plympton, Mass.
Filed May 3, 1963, Ser. No. 277,854
6 Claims. (Cl. 104—99)

The present invention relates to overhead rail systems particularly adapted for use in loading and unloading vehicles when stationed at warehouse and store platforms.

In the handling of meat, for example, it is a common practice to transport the meat from the warehouse to the stores in trucks and in order to facilitate loading and unloading operations, overhead rail systems are incorporated in the trucks with the meat being hung from wheel supported hooks, the wheels being supported and guided by the rails.

In practice there are a series of overhead storage rails extending transversely of the truck body and these are connected to a longitudinally disposed loading and unloading rail by switch means.

In practice, each hook depends at one side of its supporting wheel so that the rail system requires that the supporting structures for the rails leave corresponding sides of the rails unobstructed.

In accordance with the invention, a rail system has corresponding ends of its transverse rails spaced laterally from a longitudinal loading and unloading rail which has a gap for each of the transverse rails. A switch is provided for each transverse rail and each switch includes a bed provided with a depending stem pivotably held for vertical movement relative to the rails between a lower position of use and an upper position in which the switch may be turned from one position to another. Each switch bed also includes laterally spaced first and second rail portions with the first rail portion closing the gap in the longitudinal rail in one switch position and the second rail portion being curved and bridging the gap between the appropriate transverse rail and the longitudinal rail at one end of the associated gap in another switch position.

In the accompanying drawings, there is shown an illustrative embodiment of the invention from which these and other of its objectives, novel features, and advantages will be readily apparent.

In the drawings:

FIGURE 1 is a fragmentary perspective view of the loading and unloading rail, a transverse storage rail, and a switch, the switch being positioned to connect the storage rail to the loading and unloading rail, FIGURE 2 is a similar view but with the switch raised and shifted into an intermediate position, and FIGURE 3 is a similar view but with the switch positioned to enable the storage rail to be by-passed.

The overhead rail system illustrated by the drawings is for a truck body and includes a longitudinally disposed loading and unloading rail 10. The system also includes a series of transverse, parallel storage rails 11 and as they are identical, only one such rail is shown in the drawings. Meat supported by conventional carriers is delivered to or from a storage rail 11 when the assocated switch, generally indicated at 13, is set in the appropriate position to connect that storage rail 11 to the longitudinal rail 10.

In practice, each carrier has a track engaging wheel rotatably supported at the upper end and at one side of a depending arm to whose lower end hooks are attached. It will be noted that the rail 10 extends upwardly along one edge of a beam 17. It will also be noted that the storage rail 11 extends upwardly along the corresponding edge of the beam 18 so that, when the carrier is supported by any rail, there is no obstruction in the way of its load supporting arm.

The end of the rail 11 adjacent the rail 10 is curved as at 11A and terminates short of the rail 10 to permit the passage of a carrier 12 along the rail 10. The rail 10 is provided with a gap defining, with respect to the proximate rail 11, a forward rail end 10A and a rearward rail end 10B.

The switch 13 includes a bed 19 wider than the beam 17 and provided with a central, depending stem 20 rotatably confined in a sleeve 21 secured to the side of the beam 17 opposite the rail 10. The stem 20 is of such length that the carrier may be raised from a position of use, in which its bed 19 rests on the beam 17, into an elevated position shown in FIGURE 2 in which position it may be turned from one position of use to another.

Such vertical movement is necessary because the bed 19 has a rail portion 22 extending along one edge with its lower part 22A engaging the side of the beam 17 when the switch 13 is in its position shown in FIGURE 3, wherein the rail portion 22 fills the gap between the rail ends 10A and 10B, and because the bed 19 also has a curved rail portion 23 extending along the opposite edge with its lower part engaging the side of the beam 17 when the switch 13 is in its FIGURE 1 position in which the rail portion 23 closes the gap between the curved end 11A of the rail 11 and the rail end 10B. It will also be noted that such vertical movement of the switch 13 is necessary because there are centrally located depending stops 24 and 25 which engage the opposite side of the beam 17 in either switch position to cooperate with the operatively positioned rail portion in preventing unwanted switch movement. In practice, the stop 25 is of substantial length and L-shaped to define a handle readily accessible from below and which is indicative of the position in which the switch 13 is set. It is also to be noted that the switch bed 19 is also provided with a member 26 which, when the switch 13 is set to connect a rail 11 to the rail 10, blocks the rail end 10A.

From the foregoing, it will be apparent that overhead rail sections in accordance with the invention are well adapted to meet all requirements of use regardless of the rail system at the store or warehouse.

I claim:

1. In an overhead rail system for wheeled carriers of the type having a depending, load carrying arm, a main rail including alined sections spaced to provide a gap and a base having parallel sides and extending between said sections in support thereof, said sections extending along one of said sides, a storage rail extending laterally of said main rail adjacent but spaced from said last named side in the zone of said gap, and a switch including a depending pivot supported by the other of said sides for both vertical and rotary movement relative to said base, said switch including two rail portions, one at each side thereof, one filling said gap to bridge said sections in one switch position and the other connecting said storage rail to one of said sections when the switch is turned 180° from its first named position, said switch including depending portions engaging both of said base sides to prevent switch turning, said pivot being of such length that said switch may be elevated into a position in which said depending portions are disengaged, said pivot including a handle by which said switch may be so elevated and then turned.

2. The system of claim 1 in which the handle is L-shaped with one portion secured to the lower end of said pivot and constituting an indication of the position of the switch.

3. The system of claim 1 in which the handle is L-shaped with one portion secured to the lower end of said pivot and constituting an indication of the position of the switch with the other portion being one of the depending portions.

4. In an overhead rail system for wheeled carriers of the type having a depending, load carrying arm, a main rail including alined sections spaced to provide a gap and a base having parallel sides and extending between said sections in support thereof, said sections extending along one of said sides, a storage rail extending laterally of said main rail adjacent but spaced from said last named side in the zone of said gap, and a switch including a depending pivot supported by the other of said sides for both vertical and rotary movement relative to said base, said switch including two rail portions, one at each side thereof, one filling said gap to bridge said gap in one switch position and the other connecting said storage rail to one of said sections when the switch is turned into a second position 180° from its first named position, one of said portions blocking both rails when the switch is turned 90° from its first named position, in said first and second positions said switch including depending portions engaging both of said base sides to prevent switch turning, said pivot being of such length that said switch may be elevated into a position in which said depending portions are disengaged, said pivot including a handle by which said switch may be so elevated and then turned.

5. In an overhead rail system for wheeled carriers of the type having a depending, load carrying arm, a main rail including alined sections spaced to provide a gap and a base having parallel sides and extending between said sections in support thereof, said sections extending along one of said sides, a storage rail extending laterally of said main rail adjacent but spaced from said last named side in the zone of said gap, and a switch including a depending pivot supported by the other of said sides for both vertical and rotary movement relative to said base, said switch including two rail portions, one at each side thereof, one filling said gap to bridge said sections in one switch position and the other connecting said storage rail to one of said sections when the switch is turned 180° from its first named position, said switch including a stop then blocking the other of said sections, said switch including depending portions engaging both of said base sides to prevent switch turning, said pivot being of such length that said switch may be elevated into a position in which said depending portions are disengaged, said pivot including a handle by which said switch may be so elevated and then turned.

6. In an overhead rail system for wheeled carriers of the type having a depending, load carrying arm, a main rail including alined sections spaced to provide a gap and a base having parallel sides and extending between said sections in support thereof, said sections extending along one of said sides, a storage rail extending laterally of said main rail adjacent but spaced from said last named side in the zone of said gap, and a switch including a depending pivot supported by the other of said sides for both vertical and rotary movement relative to said base, said switch including a support and two rail portions, one at each side thereof, one filling said gap to bridge said sections in one switch position and the other connecting said storage rail to one of said sections when the switch is turned 180° from its first named position, both of said rail portions also depending below said support each for engagement with the same base sides when operatively positioned, said switch including depending portions between said rails engaging the other of said base sides in either switch position to prevent switch turning, said pivot being of such length that said switch may be elevated into a position in which said depending portions are disengaged, said pivot including a handle by which said switch may be so elevated and then turned.

References Cited by the Examiner

UNITED STATES PATENTS

| | | | |
|---|---|---|---|
| 440,907 | 11/90 | Wetzler | 104—91 |
| 451,602 | 5/91 | Richardson | 104—96 |
| 994,461 | 6/11 | Harding | 104—96 |
| 1,180,080 | 4/16 | Rothe | 104—99 |
| 1,341,996 | 6/20 | Plucienski | 104—91 |
| 1,435,608 | 11/22 | Judd | 104—99 |
| 1,690,502 | 11/28 | Raymond | 104—101 |
| 1,878,605 | 9/32 | Schmidt et al. | 104—99 |
| 2,832,298 | 4/58 | Ambli | 104—96 |
| 3,011,455 | 12/61 | Heimann | 104—96 |
| 3,063,383 | 11/62 | Toennies | 104—99 |
| 3,102,496 | 9/63 | Price | 104—98 |
| 3,104,621 | 9/63 | Withers | 104—99 X |

MILTON BUCHLER, *Primary Examiner.*

LEO QUACKENBUSH, *Examiner.*